United States Patent [19]

Krasznai et al.

[11] Patent Number: 4,517,452
[45] Date of Patent: May 14, 1985

[54] ELECTRIC TOASTER OVEN BROILER CONTROL

[75] Inventors: Charles Z. Krasznai, Trumbull; Richard L. Norwood, Waterbury, both of Conn.

[73] Assignee: Black & Decker Inc., Newark, Del.

[21] Appl. No.: 547,034

[22] Filed: Oct. 31, 1983

[51] Int. Cl.³ .................. F27D 11/02; A21B 1/40
[52] U.S. Cl. ..................... 219/413; 219/395; 219/398; 219/408
[58] Field of Search ............ 219/413, 412, 414, 405, 219/408, 398, 391, 395; 99/331, 333

[56] References Cited

U.S. PATENT DOCUMENTS

| | | | |
|---|---|---|---|
| 2,920,551 | 1/1960 | Schmall | 99/329 |
| 3,119,000 | 1/1964 | Loch et al. | 219/413 |
| 3,119,001 | 1/1964 | Andrews | 219/413 |
| 3,684,860 | 8/1972 | Snyder | 219/413 |
| 3,684,861 | 8/1972 | DeRemer | 219/413 |
| 3,752,955 | 8/1973 | Grove | 219/413 |
| 4,065,658 | 12/1977 | Keim | 219/386 |
| 4,065,659 | 12/1977 | Yount et al. | 219/398 |
| 4,178,498 | 11/1979 | Snyder | 219/413 |
| 4,188,867 | 2/1980 | DeRemer | 99/385 |
| 4,189,632 | 2/1980 | Swanson et al. | 219/413 |
| 4,302,660 | 11/1981 | Swanson et al. | 219/391 |
| 4,345,145 | 8/1982 | Norwood | 219/492 |
| 4,382,175 | 5/1983 | Huggler | 219/413 |
| 4,456,820 | 6/1984 | Krasznai | 219/398 |

*Primary Examiner*—C. L. Albritton
*Assistant Examiner*—Teresa J. Walberg
*Attorney, Agent, or Firm*—Leonard J. Platt

[57] ABSTRACT

An electric oven toaster construction wherein a unique cam follower and rotatable cam accurately sets the threshold temperature of a thermostat switch. The rotatable cam includes relatively steep rise surfaces and the cam follower includes a generally flat mounting portion, a short blade portion and a slide portion in contact with the rotatable cam. An adjusting screw is threaded through the short blade portion close to the mounting portion. With this construction, the rotary position of the cam may be manually adjusted to accurately move the short blade portion and the adjusting screw to accurately move a thermostat switch contact only approximately one-third of the distance that the steep cam surfaces move the cam follower to accurately set the position of the thermostat switch contact to set the threshold temperature of the oven toaster.

5 Claims, 10 Drawing Figures

ELECTRIC TOASTER OVEN BROILER CONTROL

BACKGROUND OF THE INVENTION

1. Field of the Invention

This invention relates to an electric oven toaster broiler and, more particularly, to an improved readily manufacturable cam control mechanism for such an oven toaster broiler.

2. Description of the Prior Art

In a prior pending application, Ser. No. 06/490,407, filed May 2, 1983, now U.S.Pat. No. 4,456,820 to Charles Z. Krazsnai and Paul V. Snyder, assigned to the same assignee as the present invention, there is disclosed a rotatable cam control mechanism for an oven toaster broiler. As shown a rotatable cam 50 is provided for setting the threshold temperature of a thermostat switch 32, 81, 83 during baking, toasting and broiling operations. A circular disc portion 92 of the cam extends rearwardly and is in sliding engagement with a thermostat cam follower 84 so that the rotary position of the cam 50 may be manually adjusted to set the disc portion 92 of the cam to set the thermostat cam follower 84 for a particular toast color. The disc portion 92 of the cam also includes a sloping cam surface for setting bake temperatures from 200° to 500° during a baking operation. In addition, the disc portion 92 of the cam includes a rearwardly extending surface for setting a very high threshold temperature for the thermostat switch 32 during a broiling operation. Thus, the rotary disc portion 92 of the cam operates on the cam follower 84 to set the position of the thermostat switch contact 83 during a toasting, broiling, or baking operation.

As shown more particularly in FIG. 8 of the pending patent application, the thermostat switch 32 includes a lower contact 81 which is fixed to a blade 82 that may be moved forwardly and downwardly by a rod 42 upon an increase in temperature in the toaster oven and an upper rearward settable contact 83. The temperature setting of the thermostat switch 32 is adjusted or set by means of the aforementioned cam follower blade 84 that extends a substantial distance to the right from a mounting block to which it is fixed. An adjusting screw 88 is connected to the free end of the cam follower blade 84 for cooperating with a switch block 90 formed of insulating material to adjust the position of the switch contact 83. Contact 83 is fixed to a blade 85 and the insulating block 90 is connected to blade 85. Accordingly, when the desired temperature within the oven toaster has been achieved, a bi-metal sensor 40 moves rod 42 forwardly to move switch contact 81 forwardly away from contact 83 to open switch 32.

As shown in FIG. 3 of the co-pending patent application, the bi-metal sensor 40 is mounted on a bracket which is connected to a mounting block 66 that is spaced somewhat to the right of the mounting for cam follower blade 84.

In the prior art construction shown in the pending patent application, the adjusting screw 88 that is connected to the free end portion of the cam follower blade 84 is positioned relatively close to the portion of the cam follower 84 that is in sliding contact with the disc portion 92 of the cam and a substantial distance away from the left fixed end portion of the cam follower blade 84 so that the cam surface 92 is made with a slight incline to move the sliding portion of the cam follower about the same distance rearwardly as it is desired to move the adjusting screw 88 rearwardly to set the position of switch contact 83.

Our invention is concerned with such an oven toaster control mechanism and, more particularly, to an improved, lower cost, more reliable cam and cam follower construction and mounting arrangement.

SUMMARY OF THE INVENTION

Accordingly, it is a particular object of our invention to provide an improved, simplified, lower cost cam follower and cam mechanism which may be more easily and more accurately manufactured to improve the accuracy and reliability of an oven toaster control mechanism.

As in the aforementioned pending application, an electric oven toaster which may be operated by our new improved cam and cam follower construction may include upper and lower heating elements, and a thermostat switch which may be set to open when a particular preset temperature has been reached. It may also include a solenoid which is operated upon opening the thermostat switch to open the main switch to deenergize both the upper and lower heating elements.

In accordance with one of the aspects of the instant invention, our cam follower blade is made much shorter than the cam follower blade 84 shown in the prior co-pending application and, more significantly, it is mounted on the same mounting block to which the bi-metal thermostat sensor is attached. Moreover, the cam follower blade is shaped to include a generally flat mounting portion, a short blade portion and a slide portion in contact with the rotatable cam. An adjusting screw is threaded through the short blade portion close to the mounting portion. With this construction, the rotary position of the cam may be manually adjusted to accurately move the short blade portion and the adjusting screw to accurately move a thermostat switch contact only approximately one-third of the distance that the cam surfaces move the cam follower to accurately set the position of the thermostat contact to set the threshold temperature of the oven toaster.

This is achieved because the rearwardly extending cam 92 may be provided with steeper inclined surfaces so that the cam follower slide portion is moved approximately three times as far rearwardly as the adjusting screw which is located very close to the pivot line of the cam follower blade. In view of the high rise cam surfaces, distortions in the toaster oven parts due to heating and subsequent cooling are minimized. By this arrangement, the rear surface 92 of the rotary cam will raise the cam follower slide portion which transmits the motion to the adjusting screw in a proportion by which the cam rise is divided by approximately three.

With this unique construction and mounting arrangement, the cam and cam follower may be manufactured at lower cost and the reliability and accuracy of the control is enhanced. Thus, a lower cost, more reliable and accurate oven toaster broiler control has been achieved.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
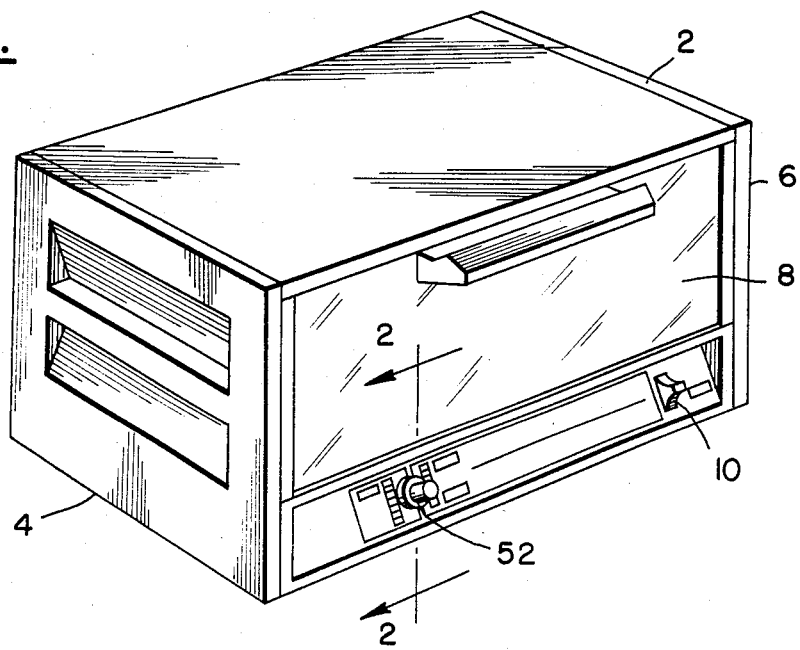
FIG. 1 is a perspective view of an electric oven toaster broiler embodying our improved control mechanism.

Referring now to the drawing and first particularly to FIG. 1, there is shown an electric oven toaster which includes a toasting, oven and broiling chamber in which is mounted a generally horizontal rack for holding food to be baked or broiled, or bread to be toasted. The oven toaster includes a generally horizontal top wall 2, generally parallel vertical side walls 4 and 6 and a front wall 8 on which the controls for the oven toaster are mounted.

Figure 9:
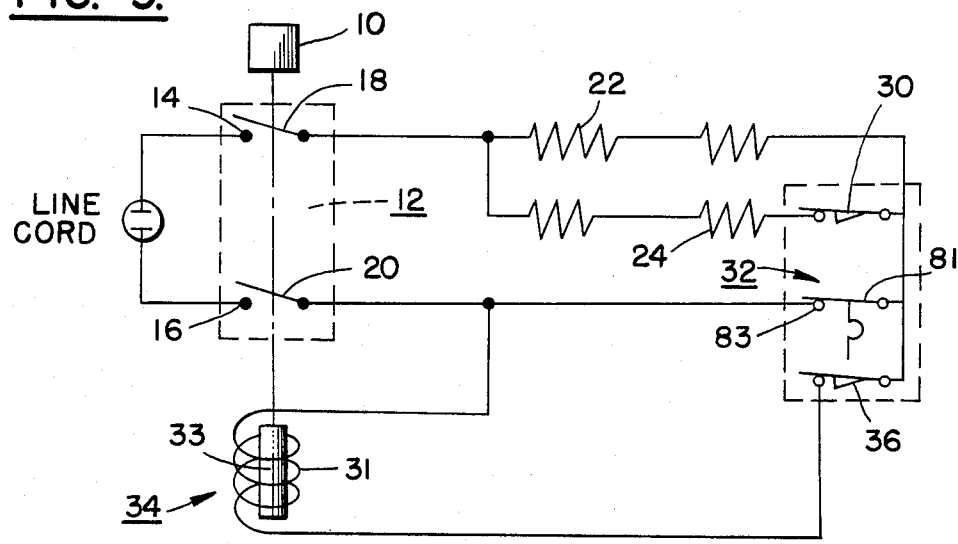
FIG. 9 is a circuit diagram and partial schematic view of portions of the control mechanism for the electric oven toaster illustrated in FIGS. 1 through 8.

With particular reference to FIGS. 1 and 9, a manually operable ON-OFF switch button 10 is located at the right side of the oven toaster for manually actuating a double pole main switch 12 that includes two fixed contacts 14 and 16 and two movable contacts 18 and 20, respectively. Upper heating elements 22 are connected in a parallel circuit relationship with lower heating elements 24 as shown in FIG. 9.

During a broiling operation, only the upper heating elements 22 should be energized and, accordingly, a broil switch 30 is provided for opening the circuit to the lower heating elements. A thermostat switch 32 including switch contacts 81 and 83 is provided for cycling the upper and lower heating elements ON and OFF to maintain the desired baking temperature during a bake operation, for interrupting power to the upper and lower heating elements at the termination of toasting cycle when a particular toast temperature or toast color is achieved and for terminating a broiling operation when an overtemperature condition is sensed.

As shown in FIGS. 1 and 9, the main switch may be manually opened or closed by simply raising or lowering switch knob 10. The main switch 12 may also be operated to its open position by energizing the solenoid 34 at the end of a toasting cycle or upon the attainment of an overtemperature condition during a broiling cycle.

A bake switch 36 is provided for opening the circuit to the solenoid to prevent the solenoid from operating during a baking operation. Thus, during a baking operation, the thermostat switch 32 may open and close to cycle the upper and lower heating elements ON and OFF without actuating the solenoid. However, during a toasting operation with the bake switch 36 closed, the thermostat switch 32 upon reaching its threshold toast color or toast temperature will open the thermostat switch to thereby energize the solenoid 34 through the closed bake switch 36 to open the main switch.

Figure 3:
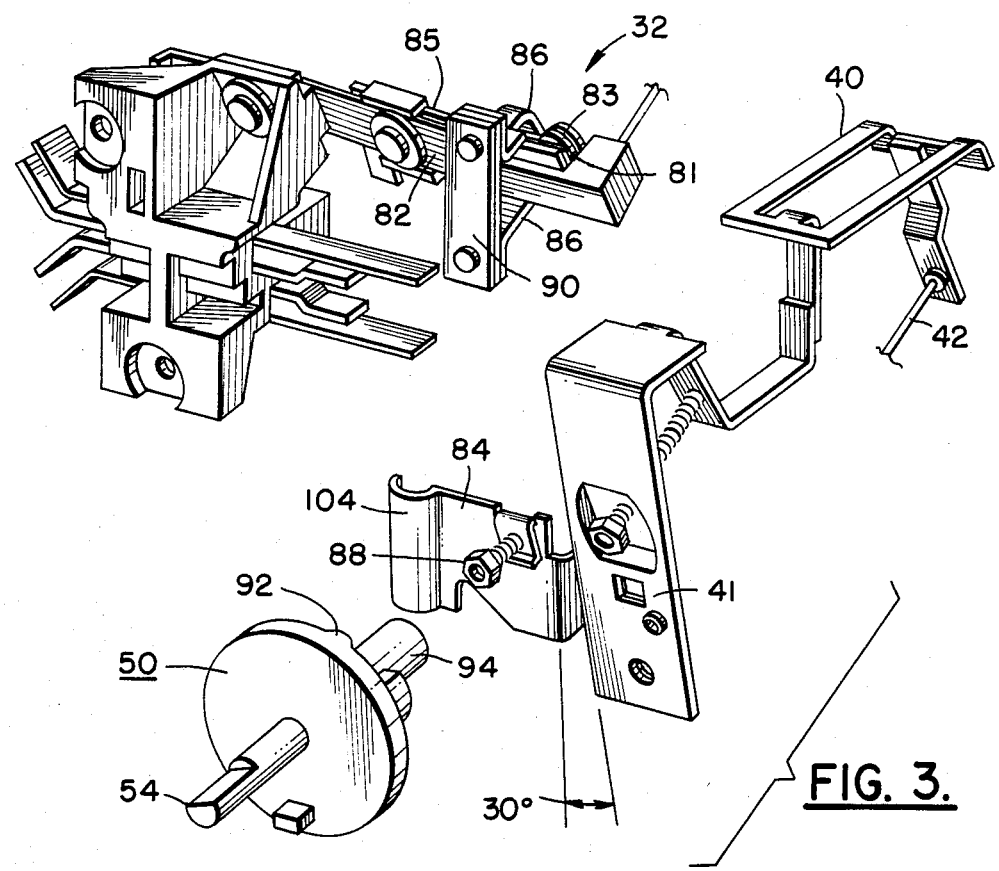
FIG. 3 is a fragmentary exploded perspective view showing our improved, simplified control mechanism.
Figure 4:
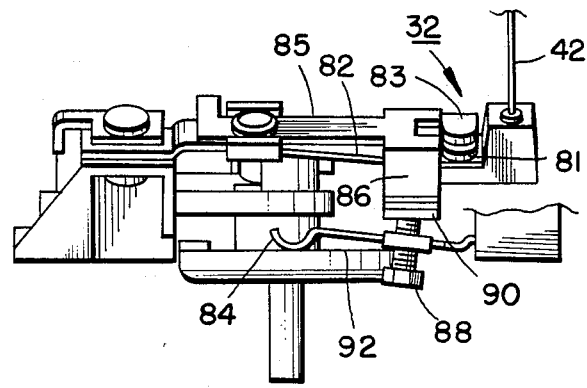
FIG. 4 is a top view of our improved control mechanism.

As shown more particularly in FIGS. 3 and 4, a temperature sensitive bi-metal 40 is mounted on a bracket 41 and is positioned within the oven toaster in spaced relation between upper heating elements 22 and lower heating elements 24 for sensing the temperature in the vicinity of the toast to thereby sense the color of the toast to be toasted and the temperature within the cooking chamber. As the bi-metal 40 increases in temperature, it flexes generally downwardly thus causing a switch actuator rod 42 to move generally horizontally forwardly to move contact 81 forwardly to open the thermostat switch 32.

A rotatable cam 50 is provided for opening or closing the switches to perform a toasting operation, a broiling operation, or a baking operation, and the cam is also constructed to simultaneously set the desired threshold temperature of the thermostat switch 32, 81, 83 for the particular operation that has been selected. As shown more particularly in FIGS. 1 and 3, the cam 50 may be readily operated by means of a knob 52 that is fixed to its shaft 54.

The thermostat switch 32, 81, 83 is provided for cycling the heating elements ON and OFF to maintain the desired temperature during the baking operation, terminating the toasting operation upon the achievement of a threshold temperature and also terminating a broiling operation on sensing an overtemperature condition.

As shown more particularly in FIGS. 3 and 4, the thermostat switch 32 includes a lower forward contact 81 which is fixed to a blade 82 that may be moved forwardly by rod 42 upon an increase in temperature and an upper rearward settable contact 83. The temperature setting of the thermostat switch 32 is adjusted or set by means of a cam follower blade 84. As shown in FIG. 4, a fine adjusting screw 88 is connected to the cam follower blade 84 for cooperating with a switch block 90 formed of insulating material to adjust the position of switch blade 85 and the switch contact 83. As shown, contact 83 is fixed to the blade 85 and the insulating block 90 is connected to the blade 85 by means of forwardly extending arms 86 that may be integrally formed with blade 85.

Figure 6:
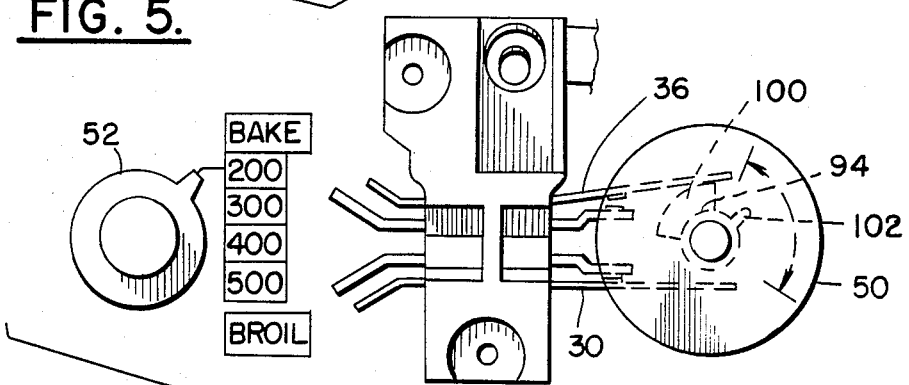
FIG. 6 is a diagrammatic view similar to FIG. 5 with the rotatable cam in the bake position, wherein a broil switch is closed, the bake switch is open and the disc portion of the cam has moved the thermostat cam follower to select a particular threshold bake temperature "200°" which will be maintained within the oven toaster.

As shown more particularly in FIGS. 3 and 4, rotatable cam 50 is formed to include a disc portion 92 for cooperating with the thermostat switch cam follower 84 and an integrally formed rearwardly extending rod portion 94 for operating the bake and broil switches 36 and 30, respectively. As shown in FIG. 6, a bake cam lobe 100 on the rod portion 94 is spaced counter-clockwise from a broil cam lobe 102.

Figure 2:
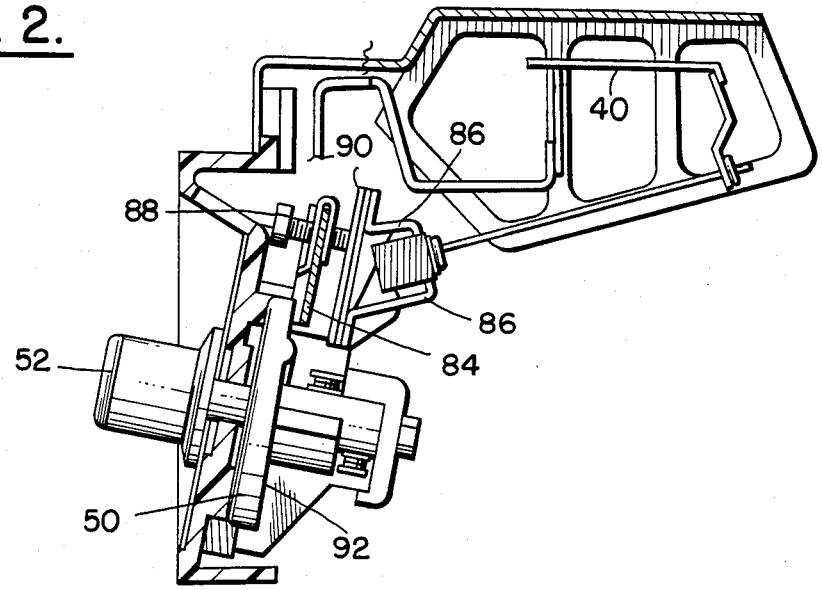
FIG. 2 is a fragmentary side elevational view of a portion of our electric control mechanism.
Figure 8:
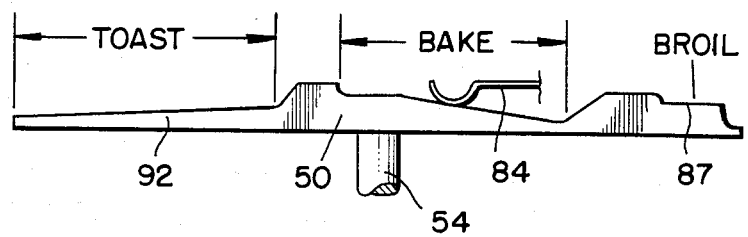
FIG. 8 is a diagrammatic view of the disc portion of the rotary cam and thermostat cam follower showing our improved higher rise disc cam surfaces that are normally disposed in a circle on the disc cam unrolled to show the relatively steep slope cam surfaces.

As shown more particularly in FIG. 2 and the unrolled or expanded view of FIG. 8, the disc portion 92 of the cam has a rearwardly facing cam surface for cooperating with the thermostat cam follower 84 to set the desired threshold temperature of the thermostat switch 32.

Figure 5:
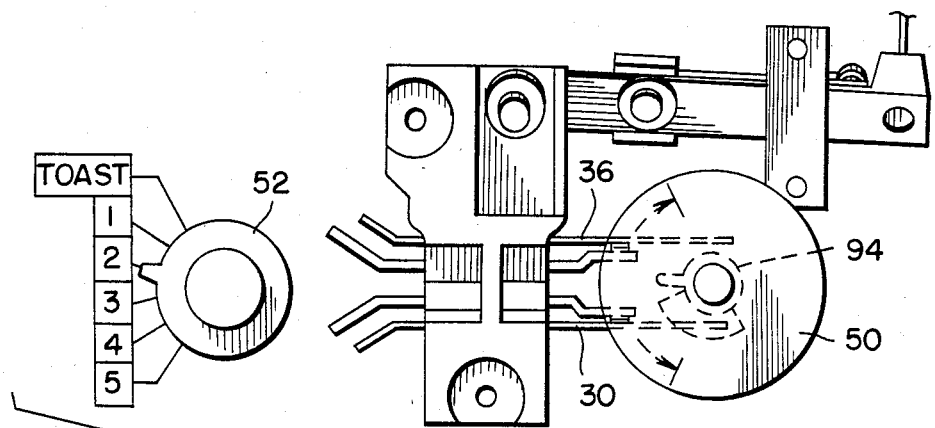
FIG. 5 is a diagrammatic front view of our improved control mechanism with the rotatable cam in a toast position wherein bake and broil switches are closed and the disc portion of the cam has selected a particular toast color 2 by adjusting the position of the thermostat cam follower.

It can be appreciated that, when the rotatable knob 52 is turned to the toast position, both the bake and broil switches will be closed as shown in FIG. 5 while the thermostat cam follower 84 will reside at a particular location on the slope of the toast cam portion of the disc cam to select the desired degree of toast color from 1 to 9.

When the cam 50 is rotated to the bake position, the bake switch 36 will be open, as shown in FIG. 6, while the thermostat cam follower will be moved to the bake temperature surface shown in FIG. 8 to select an appropriate bake temperature between 200° and 500° F.

Figure 7:
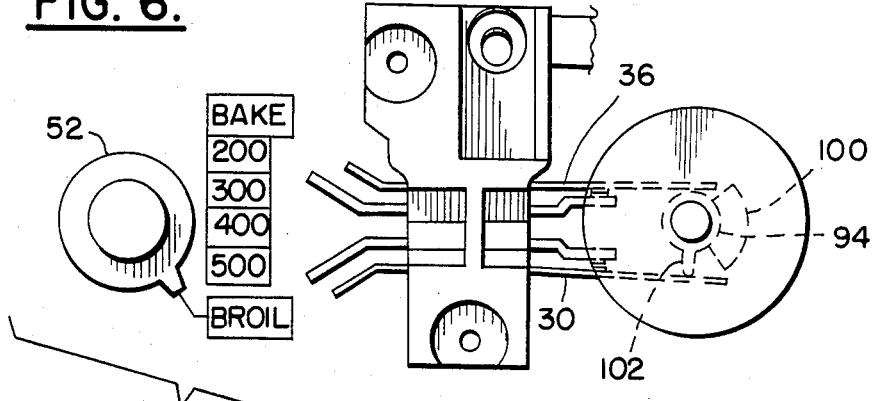
FIG. 7 is a diagrammatic view similar to FIG. 5 showing the rotatable cam in a broil position wherein the broil switch is open, the bake switch is closed and the disc portion of the cam has moved the thermostat cam follower to a very high threshold temperature about 500°.

When the cam 50 is rotated to the broil position as shown in FIG. 7, the broil switch 30 will be opened. With the broil switch open, the thermostat cam follower 84 will be on the flat 87 of the broil cam, as shown in FIG. 8, to select an overtemperature broil condition for opening the thermostat switch 32.

The details of the circuit, main switch, solenoid, and bi-metal temperature sensor 40 do not form a part of this invention and are described and illustrated in greater detail in generally similar constructions shown in a prior U.S. Pat. No. 3,752,955 to Lawrence L. Grove and a prior U.S. Pat. No. 3,119,000 to J. F. Loch et al. both assigned to the same assignee as the present invention, and the general use of a rotatable cam 50 and a cam follower 84 for setting a thermostat switch 32, 81, 83 is shown and described in the aforementioned pending application Ser. No. 06/490,407 to Krasznai and Snyder filed May 2, 1983.

In accordance with our invention, the cam follower blade 84 and the disc portion 92 of the rotatable cam 50 have been uniquely formed and positioned with respect to the mounting bracket 41 of the temperature sensitive bimetal 40 in order to improve the manufacturing reliability and the accuracy of the temperature sensitive control switch 32, 81, 83. More particularly, with the improved construction, the position of switch contact 83 may be more accurately and reliably set for succeeding toasting cycles, broiling cycles, and baking cycles. Accuracy is maintained although the components of the oven toaster and the controls may have experienced wide differences in temperatures that may change the relative positions of the parts that could change the temperature setting that is set by the position of switch 83. In order to achieve this, the cam follower blade 84 has been shortened, reshaped, and mounted at the same place as the bracket 41 for the temperature sensitive bi-metal as shown more particularly in FIG. 10. By mounting at the same place, any distortions in other portions of the control panel that may be caused by changes in temperature within the oven toaster do not affect the relative position of the bi-metal bracket to the cam follower blade 84.

Figure 10:
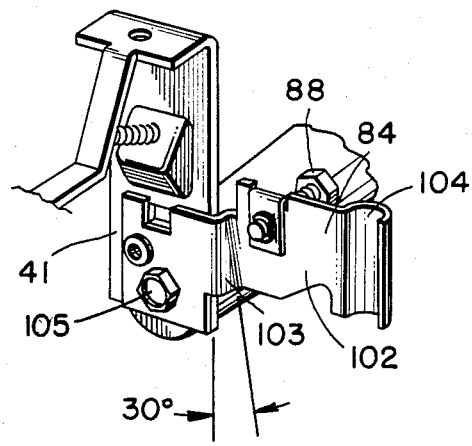
FIG. 10 is a rear perspective view showing our improved cam follower and the mounting construction for the cam follower and a bimetal thermostat bracket.

Also as shown in FIG. 10, the cam follower blade 84 has been reshaped to include a generally flat mounting portion 100, a blade portion 102 having a plane that is positioned approximately 30° with respect to the plane of the mounting portion to provide a twist pivot portion 103 that more accurately determines the line of pivoting between the blade portion 102 and the mounting portion 100.

In addition, the adjusting screw 88 is located close to the pivot portion 103 and between the slide portion 104 and the pivot portion 103.

With the improved cam follower 84, the disc portion 92 of the rotatable cam has been formed to include relatively high rise portions as shown in FIG. 8 so that the cam follower slide portion 104 is moved a greater distance for a corresponding degree of rotation of the cam 50 than in the disc cam 92 shown and described in the aforementioned pending application. The rises in the cam 92 are now so great that the cam slide portion 104 moves three times as far as the point of abutment of the end of screw 88 with the insulating block 90. Thus, with this improved construction it can be appreciated that when the rotatable control cam 50 is rotated to move the slide portion 104 of the cam follower rearwardly or forwardly, the cam follower will pivot about its pivot portion 103 to move the tip of the adjusting screw 88 and, hence, the switch contact 83 approximately one third as far as the cam rise. In other words, the rotary cam 92 will raise the cam follower slide 84 which transmits the motion to the switch 83, dividing the cam rise by three.

From the foregoing description, it will be appreciated that our improved simplified mechanism for more accurately and reliably controlling an oven toaster broiler has been achieved with the use of less material and fewer parts than the control shown and described in the aforementioned pending patent application. The cam follower 84 is shorter than the cam follower 84 shown in the co-pending application and it is mounted on the same mounting lug as the mounting bracket 41 for the thermostat bi-metal 40 with a single screw 105. Thus, fewer parts and less material are required. However, the most significant improvement is that accuracy is enchanced because of the position of the adjusting screw close to the mounting portion of the cam follower blade and the higher rise cam surfaces.

What we claim is:

1. In an electric oven toaster including upper heating elements, lower heating elements, a thermostat switch which may be set to open when a particular preset threshold temperature has been reached, a main switch for energizing and deenergizing the oven toaster including both its upper and lower heating elements, and means operated upon opening of the thermostat switch to open the main switch for energizing and deenergizing the oven toaster including both its upper and lower heating elements, and means operated upon opening of the thermostat switch to open the main switch to deenergize both the upper and lower heating elements when the particular temperature set by the thermostat is reached, the improvement comprising:

a. a manually operable cam for setting the threshold temperature of the thermostat switch;
   b. said thermostat switch including a temperature sensor, a first movable switch blade with a contact mounted thereon, said first movable switch blade being positioned for movement by said temperature sensor, and a second movable switch blade with a contact mounted thereon movable to a plurality of positions;
   c. a cam follower blade positioned between said manually operable cam and said second movable switch blade;
   d. said cam follower blade including a generally flat mounting portion, a short blade portion integrally formed with the mounting portion, and a slide portion urged into sliding contact with said manually operable cam;

e. an adjusting screw threaded through the short blade portion between the mounting portion and the slide portion, said adjusting screw having an end portion in contact with said second movable switch blade so that the position of said cam may be manually adjusted to accurately move the short blade portion to accurately move the end of said adjusting screw to accurately set a position of the contact on the second movable switch blade to set the threshold temperature of said oven toaster.

2. In an electric oven toaster including upper heating elements, lower heating elements, a thermostat switch which may be set to open when a particular preset threshold temperature has been reached, a main switch for energizing and deenergizing the oven toaster including both its upper and lower heating elements, and means operated upon opening of the thermostat switch to open the main switch to deenergize both the upper and lower heating elements when the particular temperature set by the thermostat is reached, the improvement comprising:

a. a manually operable rotatable cam movable to a plurality of rotary positions for setting the threshold temperature of the thermostat switch;

b. said thermostat switch including a temperature sensor, a first movable switch blade with a contact mounted thereon, said first movable switch blade being positioned for movement by said temperature sensor, and a second movable switch blade with a contact mounted thereon movable to a plurality of positions;

c. a cam follower blade positioned between said manually operable rotatable cam and said second movable switch blade, d. said cam follower blade including a generally flat mounting portion, a short blade portion, and a slide portion urged into sliding contact with said manually operable rotatable cam;

e. an adjusting screw threaded through the short blade portion between the mounting portion and the slide portion and being located closer to the mounting portion than the slide portion, said adjusting screw having an end portion in contact with said second movable switch blade;

f. said rotatable cam having a circular disc portion having a cam surface that extends rearwardly and is in sliding engagement with the slide portion of said cam follower, said cam surfaces being relatively steep so that a rotary position of said rotatable cam may be manually adjusted to accurately move the short blade portion to accurately move the end of said adjusting screw only approximately one third of the distance that the steep cam surfaces move the slide portion of said cam follower to accurately set a position of the contact on the second movable switch blade to set the threshold temperature of said oven toaster.

3. An electric oven toaster as defined in claim 2 wherein the temperature sensor and the flat mounting portion of said cam follower blade are mounted together by a single screw to the toaster oven in order to enhance the accuracy of the control by effectively eliminating any distortions that could occur between separate spaced mountings.

4. In an electric oven toaster including upper heating elements, lower heating elements, a thermostat switch which may be set to open when a particular preset threshold temperature has been reached, a main switch for energizing and deenergizing the oven toaster including both its upper and lower heating elements, and means operated upon opening of the thermostat switch to open the main switch to deenergize both the upper and lower heating elements when the particular temperature set by the thermostat is reached, the improvement comprising:

a. a manually operable cam movable to a plurality of positions for setting the threshold temperature of the thermostat switch;

b. said thermostat switch including a temperature sensor, a first movable switch blade with a contact mounted thereon, said first movable switch blade being positioned for movement by said temperature sensor, and a second movable switch blade with a contact mounted thereon movable to a plurality of positions;

c. a cam follower blade positioned between said manually operable cam and said second movable switch blade;

d. said cam follower blade including a generally flat mounting portion, a short blade portion positioned at an angle of approximately thirty degrees to the mounting portion to provide a twist pivot portion between the mounting portion and the short blade portion, and a slide portion urged into sliding contact with said manually operable cam;

e. an adjusting screw threaded through the short blade portion adjacent to said twist pivot portion, said adjusting screw having an end portion in contact with said second movable switch blade so that a position of said cam may be manually adjusted to accurately move the short blade portion about a stable pivot line in said twist pivot portion to accurately move the end of said adjusting screw to accurately set a position of the contact on the second movable switch blade to set the threshold temperature of said oven toaster.

5. In an electric oven toaster including upper heating elements, lower heating elements, a thermostat switch which may be set to open when a particular preset threshold temperature has been reached, a main switch for energizing and deenergizing the oven toaster including both its upper and lower heating elements, and means operated upon opening of the thermostat switch to open the main switch to deenergize both the upper and lower heating elements when the particular temperature set by the thermostat is reached, the improvement comprising:

a. a manually operable rotatable cam movable to a plurality of rotary positions for setting the threshold temperature of the thermostat switch;

b. said thermostat switch including a temperature sensor, a first movable switch blade with a contact mounted thereon, said first movable switch blade being positioned for movement by said temperature sensor, and a second movable switch blade with a contact mounted thereon movable to a plurality of positions;

c. a cam follower blade positioned between said manually operable rotatable cam and said second movable switch blade, d. said cam follower blade including a generally flat mounting portion, a short blade portion positioned at an angle of approximately thirty degrees to the mounting portion to provide a twist pivot portion between the mounting portion and the short blade portion, and a slide portion urged into sliding contact with said manually operable rotatable cam;

e. an adjusting screw threaded through the short blade portion adjacent to said twist pivot portion, said adjusting screw having an end portion in contact with said second movable switch blade;

f. said rotatable cam having a circular disk portion having a cam surface that extends rearwardly and is in sliding engagement with the slide portion of said cam follower, said cam surfaces being relatively steep so that a rotary position of said rotatable cam may be manually adjusted to accurately move the short blade portion about a stable pivot line in said twist pivot portion to accurately move the end of said adjusting screw only approximately one third of a distance that the steep cam surfaces move the slide portion of said cam follower to accurately set a position of the contact on the second movable switch blade to set the threshold temperature of said oven toaster.

* * * * *